United States Patent
Han

(10) Patent No.: US 9,411,087 B2
(45) Date of Patent: Aug. 9, 2016

(54) BACKLIGHT UNIT AND LIQUID CRYSTAL DISPLAY DEVICE HAVING THE SAME

(71) Applicant: LG Display Co., Ltd., Seoul (KR)

(72) Inventor: Young-Bae Han, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 30 days.

(21) Appl. No.: 14/333,859

(22) Filed: Jul. 17, 2014

(65) Prior Publication Data
US 2015/0277019 A1   Oct. 1, 2015

(30) Foreign Application Priority Data

Mar. 27, 2014 (KR) .................. 10-2014-0036089
May 12, 2014 (KR) .................. 10-2014-0056736

(51) Int. Cl.
*G02F 1/1335* (2006.01)
*F21V 8/00* (2006.01)

(52) U.S. Cl.
CPC ............. *G02B 6/0016* (2013.01); *G02B 6/0036* (2013.01); *G02F 1/133553* (2013.01); *G02B 6/0053* (2013.01)

(58) Field of Classification Search
CPC ............ G02F 1/133612; G02B 6/0038; G02B 6/0061; G02B 6/0016
USPC .................................. 349/65; 362/615, 626
See application file for complete search history.

(56) References Cited

U.S. PATENT DOCUMENTS

| | | | |
|---|---|---|---|
| 6,011,602 A | 1/2000 | Miyashita et al. | |
| 6,425,673 B1 | 7/2002 | Suga et al. | |
| 2004/0105157 A1 | 6/2004 | Matsushita et al. | |
| 2004/0145915 A1 | 7/2004 | Kim et al. | |
| 2005/0122591 A1 | 6/2005 | Parker et al. | |
| 2009/0109703 A1* | 4/2009 | Chen .................. | G02B 6/0036 362/620 |
| 2010/0142225 A1 | 6/2010 | Kurihara et al. | |

FOREIGN PATENT DOCUMENTS

| | | |
|---|---|---|
| EP | 1 746 457 | 1/2007 |
| JP | 2010-164657 | 7/2010 |
| JP | 2010-210882 | 9/2010 |
| KR | 10-2007-0100534 A | 10/2007 |

OTHER PUBLICATIONS

Extended European Search Report for European Patent Application No. EP 14185521.3, Aug. 10, 2015, 9 Pages.

* cited by examiner

*Primary Examiner* — Thanh-Nhan P Nguyen

(74) *Attorney, Agent, or Firm* — Fenwick & West LLP

(57) ABSTRACT

Disclosed herein is a backlight unit in which a viewing angle of a liquid crystal display device may be easily enlarged or changed. The backlight unit includes a light source, a light guide plate formed below a liquid crystal panel and including a light emitting surface through which incident light supplied from the light source is emitted toward the liquid crystal panel, a prism sheet formed between the light guide plate and the liquid crystal panel, and a plurality of protrusion patterns formed on one surface of the light guide plate which is opposite to the light emitting surface thereof, each of the plurality of protrusion patterns including a first prism which extends in a first direction and at least one second prism which extends in a second direction intersecting with the first direction, comes into contact with the first prism, and is shorter than the first prism.

21 Claims, 10 Drawing Sheets

BACKLIGHT UNIT AND LIQUID CRYSTAL DISPLAY DEVICE HAVING THE SAME

This application claims the benefit of Korean Patent Application No. 10-2014-0036089, filed on Mar. 27, 2014, and Korean Patent Application No. 10-2014-0056736, filed on May 12, 2014, which are hereby incorporated by reference as if fully set forth herein.

BACKGROUND OF THE INVENTION

1. Field of the Invention

The present invention relates to a backlight unit and a liquid crystal display device having the same, in which a viewing angle of the liquid crystal display device may be enlarged or changed and it is advantageous to form the liquid crystal display device in a thin shape.

2. Discussion of the Related Art

As the information-oriented age has arrived, the field of display which visually displays an electrical information signal has rapidly developed. Accordingly, various flat display devices with excellent features such as thinness, light weight, and low power consumption have been continuously developed.

As representative examples of the flat display devices, there are an LCD (Liquid Crystal Display device), a PDP (Plasma Display Panel device), an FED (Field Emission Display device), an ELD (Electro Luminescence Display device), an EWD (Electro-Wetting Display device), an OLED (Organic Light Emitting Display device), etc.

Such flat display devices commonly include a flat display panel which is essential to display an image. The flat display panel has a structure in which a pair of substrates is bonded opposite to each other while an inherently luminous or polarizing material is interposed therebetween.

Among others, the liquid crystal display device is a device which displays the image using optical anisotropy and polarization of liquid crystals. That is, the liquid crystal display device includes a liquid crystal panel comprising the pair of substrates and a liquid crystal layer interposed therebetween. The liquid crystal layer comprises the liquid crystals which have elongated shapes and are oriented in a predetermined initial direction. The liquid crystal panel forms an electric field to deform the directions of the liquid crystals for each pixel area in order to adjust a light transmittance of each pixel area. Therefore, the LCD displays the image.

Since the liquid crystal display device is not a device which includes an inherently luminous material to emit light by itself, the liquid crystal display device generally includes a BLU (Backlight Unit) which irradiates light onto the liquid crystal panel.

FIG. 1A is a cross-sectional view illustrating a general BLU (Backlight Unit), FIG. 1B is a cross-sectional view illustrating a light guide plate of the general BLU illustrated in FIG. 1A, and FIG. 1C is an image illustrating a dot pattern of the light guide plate illustrated in FIG. 1B.

As shown in FIG. 1A, the backlight unit 10 is disposed below the liquid crystal panel 20 and irradiates light toward the liquid crystal panel 20.

The backlight unit 10 includes a light source 11, a light guide plate 12 which converts light emitted from the light source 11 into a surface light source, a diffusion sheet 13 and a prism sheet 14, and a reflective sheet 15.

The light source 11 is disposed on at least one side of the light guide plate 12 and emits light to the light guide plate 12.

The light guide plate 12 guides incident light supplied from the light source 11, and emits light upon a light emitting surface (an upper surface of the light guide plate 12 illustrated in FIG. 1A) facing the liquid crystal panel 20. The light emitted from the light guide plate 12 has an incident angle which is equal to or less than a critical angle.

The diffusion sheet 13 and the prism sheet 14 are disposed above the light guide plate 12. The diffusion sheet 13 diffuses light emitted from the light emitting surface of the light guide plate 12, and the prism sheet 14 concentrates light.

The reflective sheet 15 is disposed below the light guide plate 12 and reflects light toward the light guide plate 12.

As shown in FIG. 1B, the light guide plate 12 includes a plurality of dot patterns 12b formed on an opposite surface (shown as a lower surface in FIG. 1B) of the light emitting surface 12a. Since light is diffused and scattered on the plurality of dot patterns 12b, the incident angle of light reached the light emitting surface 12a may be changed and thus more light has the incident angle being equal to or less than a critical angle. Therefore, the plurality of dot patterns 12b may allow light restricted within the light guide plate 12 to be reduced, resulting in an enhancement in luminance of the liquid crystal display device.

Each of the dot patterns 12b is generally produced on the light guide plate 12 using a stamper processed in a laser dotting method. Thus, as shown in FIG. 1C, there are problems in that a burr is generated around the dot pattern 12b and light is irregularly scattered from the burr.

Accordingly, in order to prevent the burr generated around the dot pattern 12b from being viewed, the backlight unit 10 should necessarily include the diffusion sheet 13 disposed between the light guide plate 12 and the liquid crystal panel 20. For this reason, there is a limit in forming the backlight unit 10 and the liquid crystal display device having the same in a thin shape.

In addition, since light is irregularly scattered by the dot pattern 12b, light emitted from the light guide plate 12 has an irregular emission angle. Thus, it may be impossible to enlarge or change a viewing angle of the liquid crystal display device. Particularly, in a case where the liquid crystal display device including the general BLU is applied to a device requiring a wide viewing angle such as a navigation device, there is a problem in that another configuration for adjusting the emission angle of light emitted from the backlight unit 10 is further required in order to enlarge or change the viewing angle.

That is, in a case of a television or a monitor, since a viewer uses the device in a state of being located in the front of the device, the viewing angle of the liquid crystal display device applied to the television or the monitor needs to be designed so as to focus on a center in the front of the device. The viewing angle of the liquid crystal display device, particularly for security, may also be limited to focus on only a central area of the device.

On the other hand, the navigation device is not generally located in the front of the driver so as not to hinder a driver's view, and particularly, is generally fixed to a center of a front seat such that all passengers in a vehicle may view the navigation device. Thus, the viewing angle of the liquid crystal display device applied to the navigation device needs to be more widely enlarged than that applied to the television or monitor, in order to cover the sides of the device. Consequently, in order to apply the liquid crystal display including the general BLU to the navigation device, the liquid crystal display should include an optical sheet for enlarging or changing the viewing angle thereof, the liquid crystal display device has limited thinness and lightness.

SUMMARY OF THE INVENTION

Accordingly, the present invention is directed to a backlight unit and a liquid crystal display device having the same that substantially obviates one or more problems due to limitations and disadvantages of the related art.

An object of the present invention is to provide the backlight unit and the liquid crystal display device having the same, in which a viewing angle of the liquid crystal display device may be easily enlarged or changed and the liquid crystal display device may be advantageously thin and light.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit, which irradiates light onto a liquid crystal panel, includes a light source, a light guide plate formed below the liquid crystal panel and including a light emitting surface through which incident light supplied from the light source is emitted toward the liquid crystal panel, a prism sheet formed between the light guide plate and the liquid crystal panel, and a plurality of protrusion patterns formed on a surface of the light guide plate which is opposite to the light emitting surface thereof, each of the plurality of protrusion patterns including a first polyhedron which extends in a first direction and at least one second polyhedron which extends in a second direction intersecting with the first direction, comes into contact with the first polyhedron, and is shorter than the first polyhedron.

Here, a first length of the protrusion pattern by the first polyhedron may be longer than a second length of the protrusion pattern by the at least one second polyhedron, and, as the first length is gradually increased, a viewing angle, by which light emitted from the liquid crystal panel is within a range capable of being observed as luminance equal to or greater than a predetermined luminance, may be enlarged in the first direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3, and FIGS. 4C and 4D are cross-sectional views taken along line I-I' and line II-II' in illustrated FIG. 4B;

DETAILED DESCRIPTION OF THE INVENTION

Reference will now be made in detail to a backlight unit and a liquid crystal display device having the same according to the preferred embodiments of the present invention, examples of which are illustrated in the accompanying drawings. Wherever possible, the same reference numbers will be used throughout the drawings to refer to the same or like parts.

Figure 2:
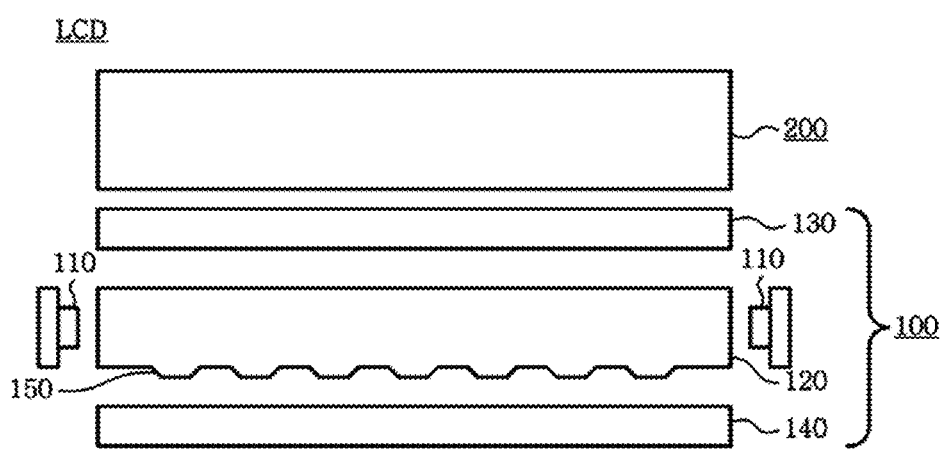
FIG. 2 is a cross-sectional view illustrating a liquid crystal display device including a backlight unit according to an embodiment of the present invention.
Figure 3:
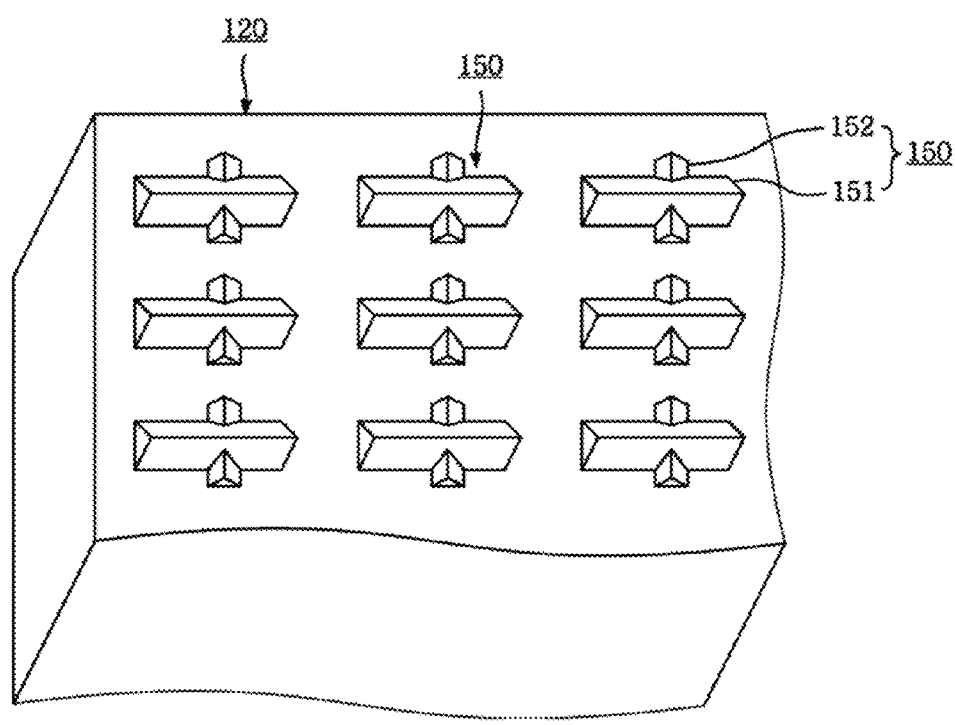
FIG. 3 is a perspective view illustrating the light guide plate illustrated in FIG. 2 and a plurality of protrusion patterns formed on a surface of the light guide plate.
Figure 4A:
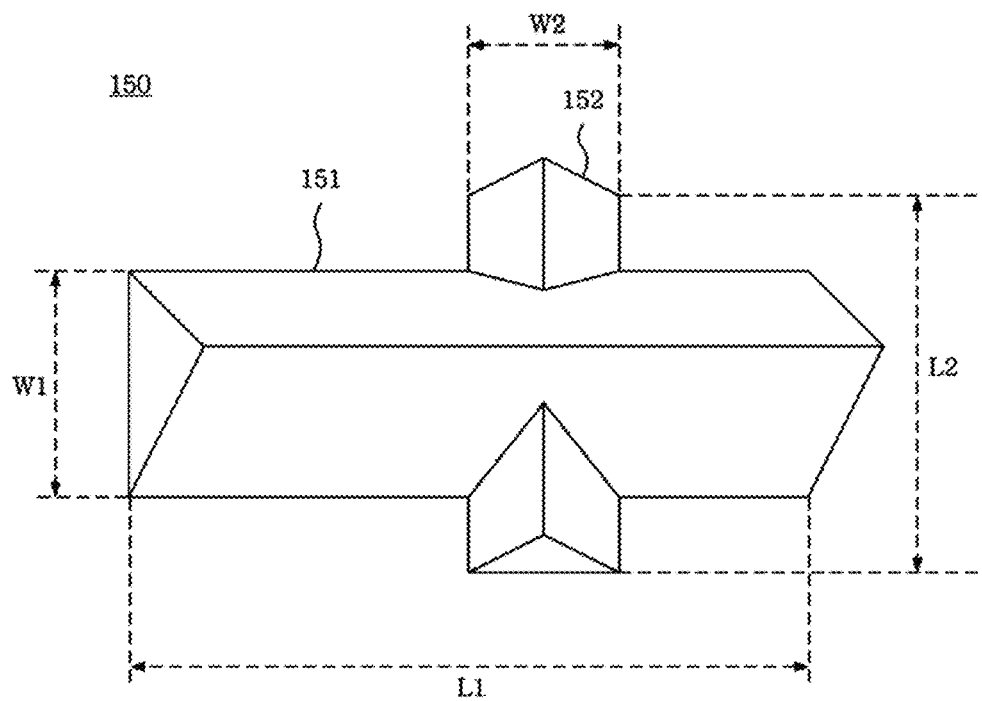
FIGS. 4A and 4B are perspective and top views illustrating any protrusion pattern in illustrated
Figure 4B:
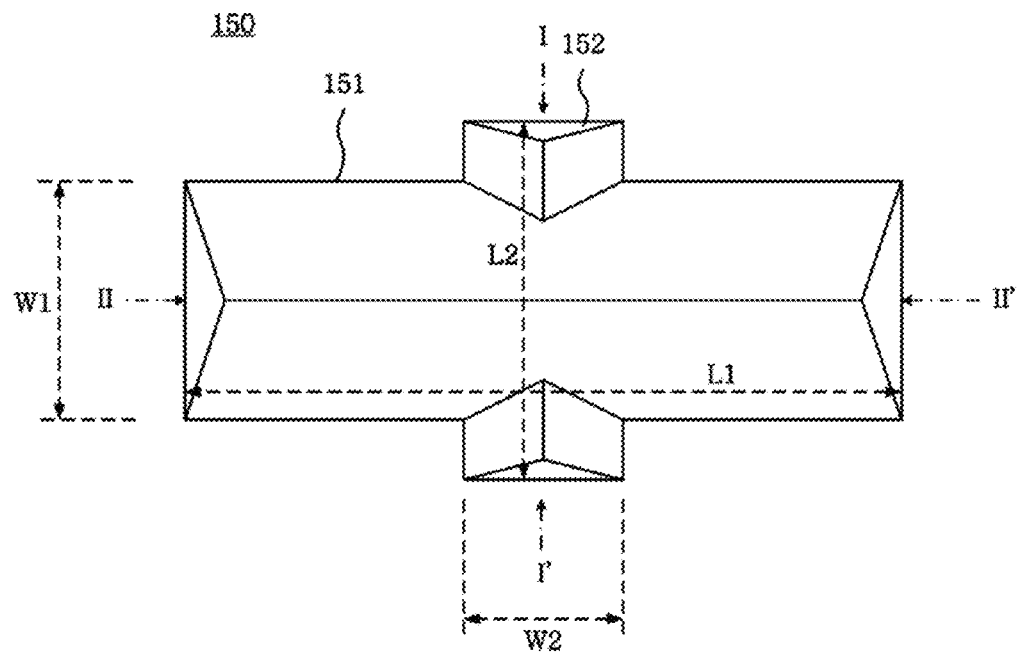
Figure 4C:
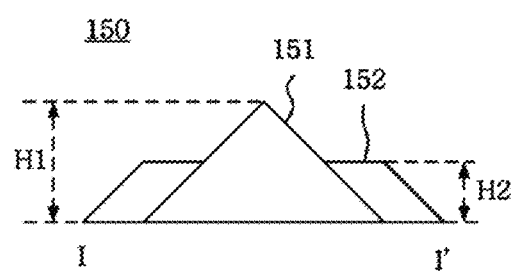
Figure 4D:
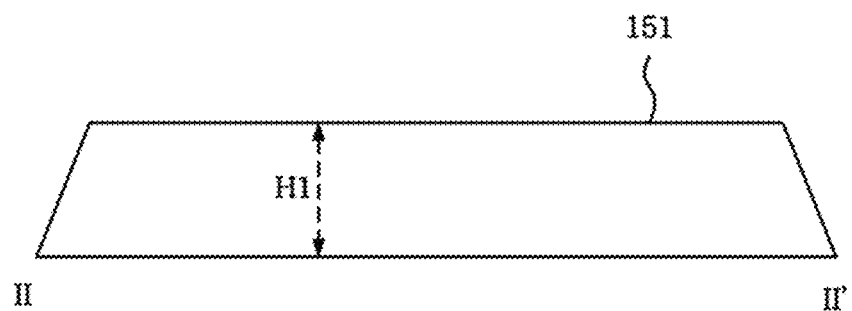

FIG. 2 is a cross-sectional view illustrating a liquid crystal display device including a backlight unit according to an embodiment of the present invention. FIG. 3 is a perspective view illustrating the light guide plate illustrated in FIG. 2 and a plurality of protrusion patterns formed on a surface of the light guide plate. FIGS. 4A and 4B are perspective and top views illustrating any protrusion pattern illustrated in FIG. 3. FIGS. 4C and 4D are cross-sectional views taken along line I-I' and line II-II' in illustrated FIG. 4B.

As shown in FIG. 2, the liquid crystal display device (LCD) according to an embodiment of the present invention includes a backlight unit 100 for supplying light and a liquid crystal panel 200 formed on the backlight unit 100.

The backlight unit 100 irradiates light onto the liquid crystal panel 200.

The liquid crystal panel 200 controls a transmittance of light irradiated from the backlight unit 100 corresponding to each of a plurality of pixel areas.

Although not shown in detail in FIG. 2, the liquid crystal panel 200 includes a pair of substrates facing each other and a liquid crystal layer interposed therebetween. In this case, liquid crystals in the liquid crystal layer have an elongated shape and are in a state of being oriented in a predetermined initial direction.

For example, the liquid crystal panel may be driven by a TN (Twisted Nematic) mode, an IPS (In Plane Switching) mode, a VA (Vertical Alignment) mode, and the like.

In the TN mode, the liquid crystals in the liquid crystal layer are initially oriented in a twisted direction by 90°. And the liquid crystal panel driven by the TN mode includes a pixel electrode and a common electrode formed on the upper and lower substrates so that the pixel electrode and the common electrode face each other in vertical direction. In this case, when directions of the liquid crystals are in the twisted direction by 90°, light is emitted in a direction of transmitting a polarizing plate through the liquid crystal layer. In contrast, when the directions of the liquid crystals are changed corresponding to a vertical electric field generated between the pixel electrode and the common electrode, light is not emitted in the direction of transmitting the polarizing plate by the liquid crystal layer.

In the IPS mode, the liquid crystals in the liquid crystal layer are initially oriented in a predetermined initial direction. And the liquid crystal panel driven by the IPS mode includes a pixel electrode and a common electrode formed on the same substrate so that the pixel electrode and the common electrode are arranged in horizontal direction. In this case, when directions of the liquid crystals are in the predetermined initial direction, light is emitted in a direction of transmitting the polarizing plate through the liquid crystal layer. In contrast, when the directions of the liquid crystals are hanged in parallel with the horizontal electric field generated between the pixel electrode and the common electrode, light is not emitted in the direction of transmitting the polarizing plate by the liquid crystal layer.

Furthermore, any one of the pair of substrates defines a plurality of pixel areas in a display area and includes a plurality of thin film transistors corresponding to the plurality of pixel areas. Each of the thin film transistors serves to switch whether or not to form the electric field for deforming the directions of the liquid crystals.

The liquid crystal panel 200 allows an image to be displayed by generating the electric field between the pixel electrode and the common electrode to deform the directions of the liquid crystals for each pixel area and adjusting a light transmittance of each pixel area.

The backlight unit 100 includes a light source 110, a light guide plate 120 formed below the liquid crystal panel 200, a prism sheet 130 formed between the light guide plate 120 and the liquid crystal panel 200, a reflective sheet 140 formed below the light guide plate 120, and a plurality of protrusion patterns 150 formed on one surface of the light guide plate 120 facing the reflective sheet 140.

The light source 110 is disposed on at least one side of the light guide plate 120 and emits light onto the light guide plate 120.

The light guide plate 120 guides incident light supplied from the light source 110 using its inside. When light moving in the light guide plate 120 reaches a light emitting surface (shown as an upper surface of the light guide plate 120 in FIG. 2) facing the liquid crystal panel 200 at an incident angle which is equal to or less than a critical angle, the light is emitted toward the liquid crystal panel 200 through the light emitting surface.

That is, the light guide plate 120 converts the incident light provided as a point light source or a linear light source from the light source 110 into a surface light source. Therefore, the light emitting surface of the light guide plate 120 facing the liquid crystal panel 200 emits the surface light source toward liquid crystal panel 200.

The prism sheet 130 concentrates light emitted from the light emitting surface of the light guide plate 120.

The reflective sheet 140 is formed below one surface of the light guide plate 120 opposite to the light emitting surface thereof to reflect light toward the light emitting surface of the light guide plate 120, namely the liquid crystal panel 200.

The plurality of protrusion patterns 150 are formed on one surface (shown as a lower surface of the light guide plate 120 in FIG. 2) which is opposite to the light emitting surface of the light guide plate 120 and faces the reflective sheet 140, so as to be formed in a convex shape compared to the light guide plate 120.

As shown in FIG. 3, the plurality of protrusion patterns 150 are arranged in a matrix (or regularized array) form in parallel with one surface of the light guide plate 120.

The plurality of protrusion patterns 150 may be spaced apart from each other at the same intervals.

Although not specifically shown in FIG. 3, it may be possible to adjust an area occupied by the plurality of protrusion patterns 150 in each unit area, in order to reduce a difference in luminance for each area according to a distance between the area and the light source 110. That is, as the area is gradually spaced apart from the light source 110, the spaced distance between the plurality of protrusion patterns 150 may be adjusted so as to be small or the sizes of the plurality of protrusion patterns 150 may be adjusted so as to be large.

As shown in FIGS. 4A and 4B, each of the plurality of protrusion patterns 150 includes two intersecting prisms. Generally, however, the protrusion patterns 150 may polyhedron shaped elements, each protrusion including two intersecting polyhedrons. In the illustrated embodiment, the intersecting polyhedrons are geometric prism shaped elements having two polygonal faces lying in parallel planes, and where the other faces of the prism are parallelograms. Generally, the surfaces of the polyhedrons diffuse, reflect, refract, and/or disperse light. In other embodiments, (not shown) the polyhedrons of the protrusion pattern may instead be any shape of polyhedron, rather than prism shaped specifically.

In one embodiment, each of the plurality protrusion patterns 150 includes two prisms, a first prism 151 extending in a first direction (a left and right direction in FIGS. 3, 4A, and 4B), and at least one second prism 152 extending in a second direction (an upward and downward direction in FIGS. 4A and 4B) of intersecting with the first direction. The second prism 152 comes into contact with the first prism 151 and has a length smaller than the first prism 151.

That is, a first length L1 of the protrusion pattern 150 by the first prism 151 is longer than a second length L2 of the protrusion pattern 150 by the at least one second prism 152.

For example, one second prism 152 in each protrusion pattern 150 may intersect with the first prism 151, as shown in FIGS. 4A and 4B.

However, a case shown in FIGS. 4A and 4B is only illustrative. The present invention may also be applied in any form as long as the second prism 152 of each protrusion pattern 150 comes into contact with the first prism 151, has a length smaller than the first prism 151, and extends in a different direction from the first prism 151.

In accordance with the embodiment of the present invention, a viewing angle of the LCD (Liquid Crystal Display device) is enlarged in the first direction corresponding to the first length L1 of the protrusion pattern 150. Here, the viewing angle is a range in which light of the LCD (Liquid Crystal Display device) may be viewed as luminance equal to or greater than a predetermined critical luminance in a position at which a user uses the LCD.

In other words, the first and second prisms 151 and 152 are formed in different lengths from each other, and the length direction, namely the first direction (left and right direction in FIGS. 3, 4A, and 4B), of the first prism 151 having a length longer than that of the second prism 152 is a direction in which the viewing angle of the LCD is enlarged.

Specifically, a portion of the incident light within the light guide plate 120 enters the protrusion patterns 150. In this case, light in each protrusion pattern 150 is emitted to the outside through the light emitting surface of the light guide plate 120 in a state of being guided and refracted in the first direction by the first prism 151.

Consequently, the viewing angle of the LCD is enlarged and/or changed to an area widened in the first direction (left and right direction) by the first prism 151. That is, the luminance of the LCD, which is observed at an off-center position of the LCD, may be increased.

There may be light which is totally internally reflected at an incident angle equal to or greater than a critical angle within the first prism 151, and thus restricted within the first prism 151. As such, light restricted within the first prism 151 may be refracted at another incident angle by the second prism 152 to be emitted outward of the protrusion pattern 150. That is, since light restricted within the first prism 151 may be reduced by the second prism 152, it may be possible to prevent luminance from being deteriorated due to the protrusion pattern 150.

For example, the first length L1 of the protrusion pattern 150 by the first prism 151 may be 70 um to 90 um, and the second length L2 of the protrusion pattern 150 by the at least one second prism 152 may be shorter than the first length L1 and be 40 um to 50 um.

The first prism 151 has a width W1 (hereinafter, referred to as "first width") which is equal to or less than one-third of the first length L1. This prevents the viewing angle from being enlarged in a width direction of the first prism 151 by the first prism 151, namely in the second direction (upward and downward direction in FIGS. 3, 4A, and 4B).

The second prism 152 has a width W2 (hereinafter, referred to as "second width") which is equal to or less than one-half of the second length L2. This prevents the viewing angle from being enlarged in an unintended direction by the second prism 152, namely in the width direction of the first prism 151 which is the second direction (upward and downward direction).

For example, the first prism 151 may be formed by the first length L1 of 70 um to 90 um and the first width W1 of 20 um to 30 um which is equal to or less than the half of the first length L1.

The first and second prisms 151 and 152 may intersect with each other at the respective center thereof. In this case, the second prism 152 may be formed by the second length L2 of 40 um to 50 um and the second width W2 of 10 um to 20 um. Although not separately shown in the drawings, the intersection point of the first and second prisms 151 and 152 may also be changed according to the intention of a user or a designer.

As shown in FIG. 4C, a height H1 (hereinafter, referred to as "first height") of the first prism 151 is higher than a height H2 (hereinafter, referred to as "second height") of the second prism 152. This prevents the viewing angle from being enlarged in an unintended direction by the second prism 152, namely in the width direction of the first prism 151 which is the second direction (upward and downward direction).

The first height H1 of the first prism 151 is equal to or less than one-half of the first width W1. Similarly, the second height H2 of the second prism 152 is equal to or less than one-half of the second width W2. Otherwise, light restricted within the protrusion pattern 150 may be increased.

For example, the height H1 of the first prism 151 may be 10 um and the height H2 of the second prism 152 may be 5 um.

As shown in FIG. 4D, both side surfaces of the first prism 151 may be inclined. That is, the first prism 151 may has a side sectional surface of a mesa shape (trapezoidal shape).

Although not separately shown in the drawings, both side surfaces of the second prism 152 may also be inclined. The second prism 152 may also has a side sectional surface of a mesa shape (trapezoidal shape).

When the side sectional surfaces of each of the first and second prisms 151 and 152 are formed in the mesa shape, the light guide plate 120 having the plurality of protrusion patterns 150 may be easily manufactured using the stamper.

Figure 1A:
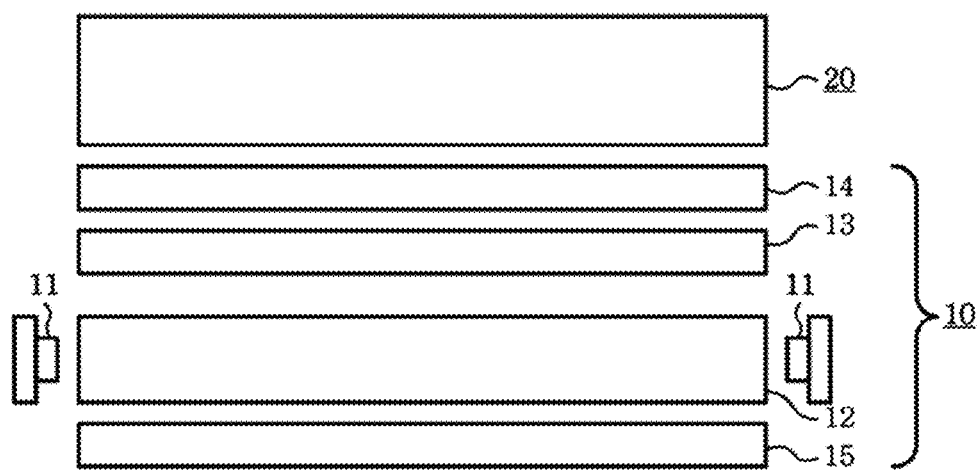
FIG. 1A is a cross-sectional view illustrating a general BLU (Backlight Unit)
Figure 1B:
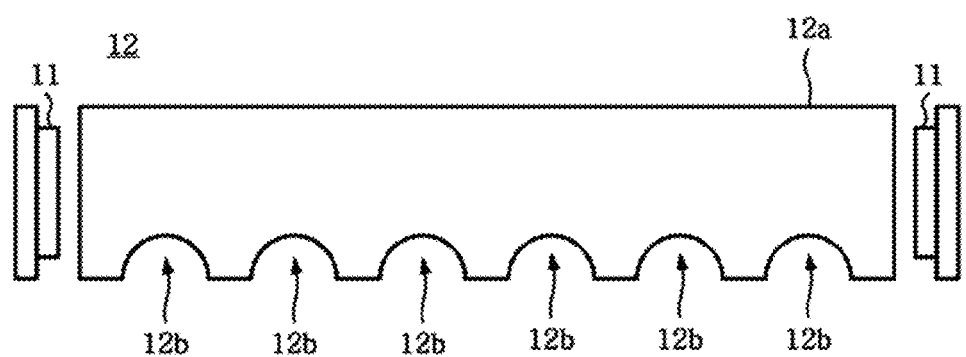
FIG. 1B is a cross-sectional view illustrating a light guide plate of the general BLU illustrated in FIG. 1A.
Figure 1C:
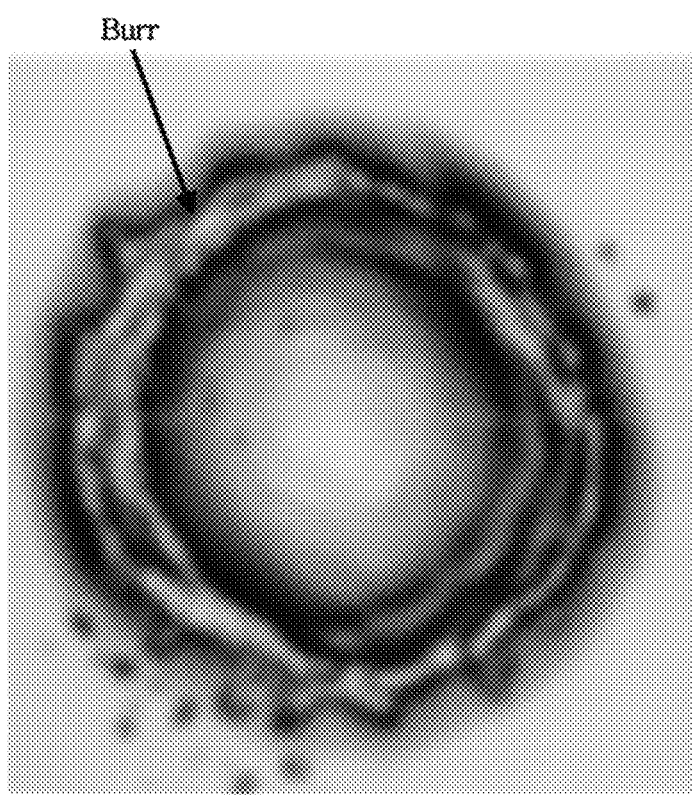
FIG. 1C is an image illustrating a dot pattern of the light guide plate illustrated in FIG. 1B.

Next, referring to FIGS. 5A and 5B and the following Table 1, a description will be given that the backlight unit 100 according to the embodiment of the present invention enlarges the viewing angle of the liquid crystal display device compared to the general backlight unit 10 (see FIGS. 1A, 1B, and 1C). The following Table 1 indicates a simulation result which virtually measures the rate of increase in luminance and contrast ratio of the backlight unit 100 according to the embodiment of the present invention with respect to the general backlight unit 10.

As described above, the general backlight unit 10 includes the plurality of dot patterns 12b formed on the lower surface of the light guide plate 12 and the burr generated around the same. For this reason, light in the backlight unit 10 is irregularly scattered. Therefore, it is actually impossible to control the emission angle of light emitted from the backlight unit 10 without another optical sheet.

Figure 5A:
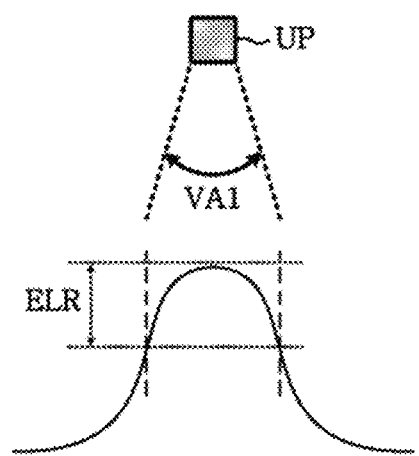
FIG. 5A is a view exemplarily illustrating luminance for each viewing position of light emitted from an unit pixel area (UP) of the liquid crystal display device including the general backlight unit.

Thus, as shown in FIG. 5A, in the liquid crystal display device which includes the general backlight unit 10 without another optical sheet for controlling the emission angle of light, light emitted from an unit pixel area UP may be viewed within an ELR (Effective Luminance Range) at a predetermined first viewing angle VA1.

On the other hand, the backlight unit 100 according to the embodiment of the present invention includes the plurality of protrusion patterns 150 each of which is formed on the lower surface of the light guide plate 120 and is formed by the first and second prisms 151 and 152.

Light is diffused and/or changed to an area widened in the longitudinal direction of the first prism 151, namely in the first direction by the first prism 151 longer than the second prism 152 in each protrusion pattern 150.

Accordingly, light is enlarged in the longitudinal direction of the first prism 151 longer than the second prism 152. Consequently, the viewing angle of light emitted from the light emitting surface of the light guide plate 120 is enlarged and/or changed in the longitudinal direction of the first prism 151, namely in the first direction.

Figure 5B:
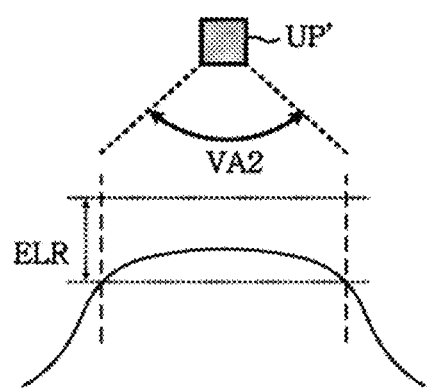
FIG. 5B is a view exemplarily illustrating luminance for each viewing position of light emitted from the UP (unit pixel area) of the liquid crystal display device including the backlight unit according to the embodiment of the present invention.

As shown in FIG. 5B, in the LCD (Liquid Crystal Display device) including the backlight unit 100 according to the embodiment of the present invention, light emitted from an unit pixel area UP' may be viewed within an ELR (Effective Luminance Range) at a second viewing angle VA2 greater than the first viewing angle VA1, instead of having maximum luminance lower than that of FIG. 5A.

Therefore, according to the embodiment of the present invention, it may be identified that the luminance and the contrast ratio observed at the off-center position of the liquid crystal display device are improved compared to those of the liquid crystal display device including the general backlight unit, as indicated by the following Table 1.

TABLE 1

| Viewing angle at observed area | Rate of increase in luminance | Rate of increase in contrast ratio |
|---|---|---|
| A (Θ = ±40°/φ = +20°, −10°) | 33% | 20% |
| B (Θ = ±50°/φ = +20°, −10°) | 34% | 22% |

In one embodiment, the luminance of the display at observed area B is at least 220 candela per square meter.

The backlight unit 100 according to the embodiment of the present invention includes the plurality of protrusion patterns 150 formed on one surface of the light guide plate 120. Consequently, light emitted from the light emitting surface of the light guide plate 120 may be uniformly diffused instead of being concentrated on a specific area. Particularly, the light may be adjusted so as to be viewed at the viewing angle in a specific direction according to the use of the device to which the liquid crystal display device is applied.

The backlight unit 100 need not include another diffusion sheet arranged between the light guide plate 120 and the liquid crystal panel 200. Thus, the backlight unit 100 and the LCD (Liquid Crystal Display device) including the same may be advantageously thin and light and may be manufactured at lower costs.

In addition, in a case where the liquid crystal panel 200 is in the IPS mode, when the directions of the liquid crystals within the liquid crystal layer are changed in parallel with the horizontal electric field formed between the pixel electrode and the common electrode, black is indicated. When the diffusion sheet 13 is included like the existing backlight unit 10 (see FIG. 1A), light is irregularly diffused by the diffusion sheet 13 and thus may be reflected by coming into contact with the liquid crystals in a direction corresponding to the horizontal electric field. Consequently, there is a problem in that a contrast ratio between white and black may be lowered by the diffusion sheet 13.

On the other hand, since the backlight unit 100 according to the embodiment of the present invention includes the plurality of protrusion patterns 150 while not including the diffusion sheet, it may be possible to previously prevent the contrast ratio in the liquid crystal panel 200 of the IPS mode from being lowered.

Meanwhile, although FIGS. 3, 4A, and 4B show that the protrusion pattern 150 has a form in which the first and second prisms 151 and 152 intersect with each other, the protrusion pattern 150 according to the present invention may also include a second prism which do not intersect with the first prism 151.

Figure 6:
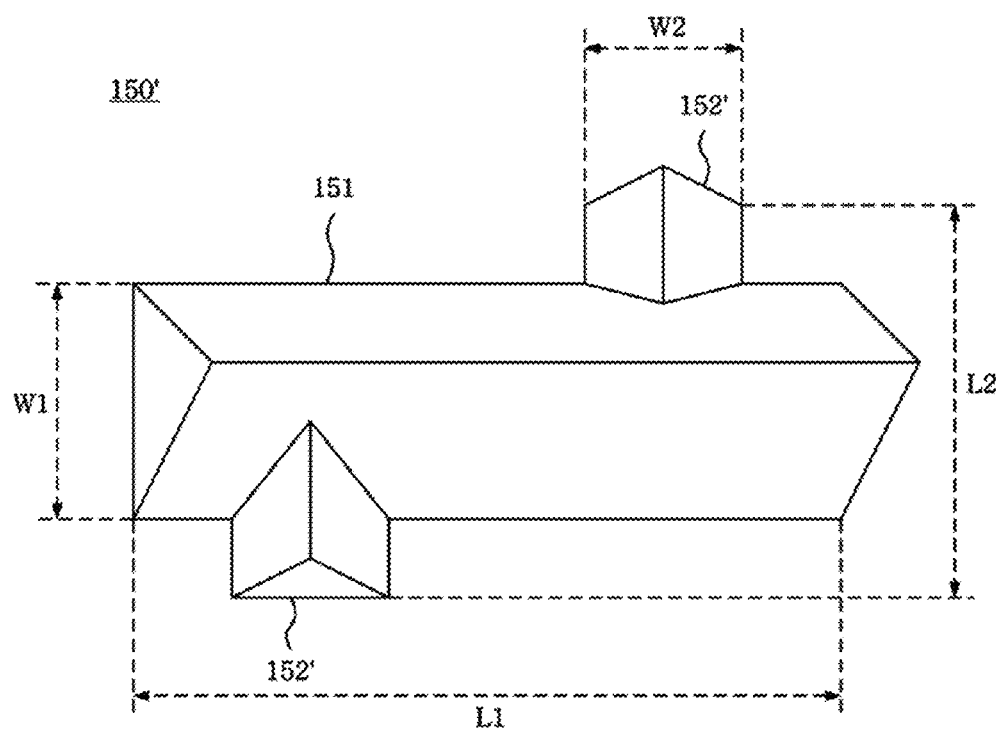
FIG. 6 is a perspective view illustrating a protrusion pattern according to another embodiment of the present invention.
Figure 7:
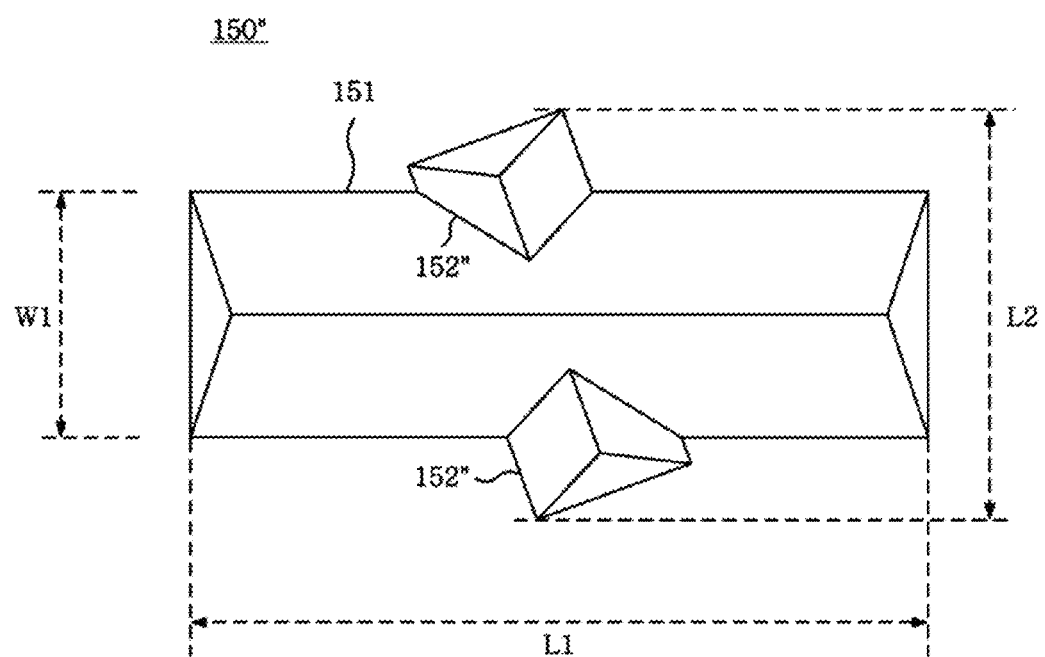
FIG. 7 is a top view illustrating a protrusion pattern according to a further embodiment of the present invention.

FIG. 6 is a perspective view illustrating a protrusion pattern according to another embodiment of the present invention. FIG. 7 is a top view illustrating a protrusion pattern according to a further embodiment of the present invention.

As shown in FIG. 6, a protrusion pattern 150' according to another embodiment of the present invention includes two second prisms 152' coming into contact with the first prism 151. In this case, the two second prisms 152' may come into contact with both side surfaces of the first prism 151 and may extend so as not to face each other. In addition, the second prisms 152' may also be arranged in a point-symmetrical form on the basis of the first prism 151. The two second prisms 152 may alternately be referred to as the second and third prisms.

The second prism and the third prism both intersect the first prism. In one embodiment, the second and third prism are both oriented parallel to each other along the second direction, however the third prism is laterally offset from the second prism along the first direction.

In addition, although FIGS. 3, 4A, 4B, and 5 show that the at least one second prism 152 or 152' extends in the second direction (upward and downward direction), the at least one second prism 152 or 152' may extend in any direction of intersecting with the first direction instead of the second direction (upward and downward direction).

That is, as shown in FIG. 7, a protrusion pattern 150" according to a further embodiment of the present invention includes at least one second prism 152" extending in a second direction that is diagonal with respect to the first direction. That is, the second direction intersects at an angle greater than zero with the first direction.

In accordance with the embodiment of the present invention, the plurality of protrusion patterns each of which includes the first and second prisms are formed on one surface of the light guide plate opposite to the light emitting surface thereof.

In this case, the first prism is longer than the second prism. Accordingly, light incident upon the light guide plate is primarily guided and refracted within the light guide plate and is then secondarily guided and refracted along a longer prism of the first and second prisms in each of the plurality of protrusion patterns, namely along the first prism. Consequently, the emission angle of light emitted from the light emitting surface of the light guide plate may be controlled by the protrusion patterns.

Therefore, the viewing angle of the liquid crystal display device may be changed or enlarged without addition of another configuration. Thus, it may be possible to easily apply the liquid crystal display device to the navigation device requiring a relatively wide viewing angle.

Since the second prism changes the incident angle of light which is totally reflected within the first prism, light restricted within the first prism may be decreased. As a result, it may be possible to prevent luminance from being deteriorated due to the protrusion patterns.

In addition, since light having the controlled emission angle need not be diffused by the protrusion patterns, the diffusion sheet may be removed between the light guide plate and the liquid crystal panel. Consequently, the backlight unit and the liquid crystal display device including the same may be advantageously thin.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit which irradiates light onto a liquid crystal panel, comprising:
 a light source;
 a light guide plate formed below the liquid crystal panel and comprising a light emitting surface through which incident light supplied from the light source is emitted toward the liquid crystal panel;
 a prism sheet located between the light guide plate and the liquid crystal panel; and
 a plurality of protrusion patterns extending outward from a surface of the light guide plate opposite to the light emitting surface, each of the plurality of protrusion patterns comprising a first triangular prism extending in a first direction and a second triangular prism extending in a second direction crossing the first direction such that the first triangular prism and the second triangular prism cross through each other, the first triangular prism being longer along the first direction than the second triangular prism being along the second direction.

2. The backlight unit according to claim 1,
 wherein the first triangular prism refracts light incident from the light source towards the light emitting surface; and
 wherein the second triangular prism refracts light towards the light emitting surface that has been totally internally reflected by the first triangular prism.

3. The backlight unit according to claim 1, wherein a viewing angle is determined based on a first length of the first triangular prism along the first direction, wherein within the viewing angle a luminance of light emitted from the backlight unit is greater than a predetermined luminance of 220 candela per square meter.

4. The backlight unit according to claim 1, wherein:
the first direction is perpendicular to the second direction.

5. The backlight unit according to claim 1, wherein:
the first direction forms an angle greater than zero degrees with the second direction.

6. The backlight unit according to claim 1, wherein:
the first triangular prism is longer along the first direction than the second triangular prism along the first direction.

7. The backlight unit according to claim 1, wherein:
the second triangular prism is longer along the second direction than the first triangular prism along the second direction.

8. The backlight unit according to claim 1, wherein:
the first triangular prism has a first width less than or equal to one-half of a first length of the first triangular prism.

9. The backlight unit according to claim 8, wherein:
the first width is less than or equal to one-third of the first length.

10. The backlight unit according to claim 1, wherein:
the second triangular prism has a second width equal to or less than one-half of a second length of the second triangular prism.

11. The backlight unit according to claim 1, wherein:
the first triangular prism is between 70 μm to 90 μm long along the first direction and is between 20 μm to 30 μm wide; and
the second triangular prism is between 40 μm to 50 μm long along the second direction is 10 μm to 20 μm wide.

12. The backlight unit according to claim 1, wherein:
the first triangular prism has a first height greater than a second height of the second triangular prism.

13. The backlight unit according to claim 1, wherein:
the first triangular prism has a height less than or equal to one-half of a first width of the first triangular prism.

14. The backlight unit according to claim 1, wherein:
the second triangular prism has a height less than or equal to one-half of a second width of the second triangular prism.

15. The backlight unit according to claim 1, wherein the backlight unit does not include a light diffusing element other than the light guide plate and the prism sheet.

16. A liquid crystal display device comprising:
the backlight unit according to claim 1; and
the liquid crystal panel connected to the backlight unit and controlling a transmittance of light emitted by each of a plurality of pixel areas emanating the backlight unit.

17. The backlight unit according to claim 1, wherein the first triangular prism protrudes and crosses through a protruding portion of the second triangular prism between two ends of the second triangular prism, and wherein the second triangular prism protrudes and crosses through a protruding portion of the first triangular prism between two ends of the first triangular prism protruding.

18. A liquid crystal display (LCD) device comprising:
a backlight unit comprising:
a light source;
a prism sheet;
a light guide plate including a plurality of protrusions formed in a bottom surface of the light guide plate, each of the plurality of protrusions comprising a first polyhedron and a second polyhedron protruding from the bottom surface and extending through each other, the light guide plate receiving light from the light source and emitting light through a top surface towards the prism sheet, light passing through the light guide plate being diffused by the plurality of protrusions; and
a liquid crystal panel controlling a transmittance of light emitted from the backlight unit.

19. The LCD device according to claim 18, wherein the polyhedrons are prism shaped polyhedrons.

20. The LCD device according to claim 18, wherein the first polyhedron extends through a protruding portion of the second polyhedron between two ends of the second polyhedron, and wherein the second polyhedron extends through a protruding portion of the first polyhedron between two ends of the first polyhedron.

21. The LCD device according to claim 18, wherein each of the first polyhedron and the second polyhedron is a triangular prism shaped polyhedron.

* * * * *